(12) United States Patent
Turner

(10) Patent No.: US 9,857,214 B2
(45) Date of Patent: Jan. 2, 2018

(54) SCALE FOR WEIGHING PARCELS

(71) Applicant: VELOX ROBOTICS, LLC, Bainbridge Island, WA (US)

(72) Inventor: Bryan J. Turner, Bainbridge Island, WA (US)

(73) Assignee: VELOX ROBOTICS, LLC, Bainbridge Island, WA (US)

( * ) Notice: Subject to any disclaimer, the term of this patent is extended or adjusted under 35 U.S.C. 154(b) by 0 days.

(21) Appl. No.: 15/356,086

(22) Filed: Nov. 18, 2016

(65) Prior Publication Data

US 2017/0067772 A1 Mar. 9, 2017

Related U.S. Application Data

(62) Division of application No. 14/267,454, filed on May 1, 2014, now Pat. No. 9,564,849.

(Continued)

(51) Int. Cl.
*G01R 31/02* (2006.01)
*H02P 1/00* (2006.01)
(Continued)

(52) U.S. Cl.
CPC ........... *G01G 11/04* (2013.01); *G01G 11/043* (2013.01); *G01G 19/005* (2013.01);
(Continued)

(58) Field of Classification Search
CPC .... G01G 11/04; G01G 19/005; G01G 19/415; H02P 29/40; H02P 31/00
See application file for complete search history.

(56) References Cited

U.S. PATENT DOCUMENTS 2,538,369 A 1/1951 Leary
3,386,574 A 6/1968 Kaplan
(Continued)

FOREIGN PATENT DOCUMENTS

EP 0482267 4/1992
EP 2172751 A1 4/2010
(Continued)

OTHER PUBLICATIONS

WIPOTEC Principle of Operation; retrieved from the internet on Sep. 13, 2007 at http://www.industrialcontroller.com/wipotec/operation.htm; 2 Pages.

(Continued)

*Primary Examiner* — Paul Ip
(74) *Attorney, Agent, or Firm* — Fisherbroyles, LLP; Micah D. Stolowitz

(57) ABSTRACT

Weighing system (FIG. 3, FIG. 6) to weigh items, parcels and the like, while they are moving, for example, on a conveyor. A servo amplifier (14) and servo controller (20) are arranged to drive a servo motor in a feedback (15) configuration, and acquire torque sensing signals (17) responsive to commanded acceleration of the conveyor while the item(s) are on board. Preferably, constant acceleration of the item(s) is realized during one or more measurement intervals, and mass is derived by a processor (30) based on the measurement data (FIG. 5). Other embodiments are described for weighing granular and slurry materials (FIG. 7) and for weighing multiple, potentially overlapping parcels in motion (FIG. 8).

20 Claims, 10 Drawing Sheets

Related U.S. Application Data

(60) Provisional application No. 61/819,857, filed on May 6, 2013, provisional application No. 61/894,802, filed on Oct. 23, 2013.

(51) Int. Cl.

| | | |
|---|---|---|
| H02P 29/00 | (2016.01) | |
| G01G 11/04 | (2006.01) | |
| G01G 19/00 | (2006.01) | |
| G01G 19/03 | (2006.01) | |
| H02P 31/00 | (2006.01) | |
| H02P 29/40 | (2016.01) | |
| G01G 19/415 | (2006.01) | |

(52) U.S. Cl.
CPC ......... *G01G 19/035* (2013.01); *G01G 19/415* (2013.01); *H02P 29/40* (2016.02); *H02P 31/00* (2013.01)

(56) References Cited

U.S. PATENT DOCUMENTS

| | | |
|---|---|---|
| 3,431,830 A | 3/1969 | Stovall |
| 3,566,717 A | 3/1971 | Berman |
| 3,648,839 A | 3/1972 | Bradshaw |
| 3,668,485 A | 6/1972 | Norris |
| 3,718,031 A | 2/1973 | Christmann |
| 3,724,720 A | 4/1973 | Bullivant |
| 3,791,473 A | 2/1974 | Rosen |
| 3,796,424 A | 3/1974 | Fox |
| 3,805,904 A | 4/1974 | Zimmerer |
| 3,834,474 A | 9/1974 | Knol |
| 3,957,570 A | 5/1976 | Helm |
| 4,170,350 A | 10/1979 | Conti |
| 4,194,649 A | 3/1980 | Bullivant |
| 4,262,763 A | 4/1981 | Raskin |
| RE30,684 E | 7/1981 | Bullivant |
| 4,277,022 A | 7/1981 | Holdsworth |
| 4,277,918 A | 7/1981 | Bass |
| 4,347,905 A | 9/1982 | Berckes |
| 4,384,629 A | 5/1983 | Kotzin |
| 4,461,363 A | 7/1984 | Loy |
| 4,522,277 A | 6/1985 | Kotzin |
| 4,534,551 A | 8/1985 | Jones |
| 4,653,630 A | 3/1987 | Bravin |
| 4,696,358 A | 9/1987 | Doerman |
| 4,792,002 A | 12/1988 | Ward |
| 4,848,492 A | 7/1989 | Hubbard |
| 4,916,391 A | 4/1990 | Doerman |
| 5,019,991 A | 5/1991 | Sansone |
| 5,056,647 A | 10/1991 | Rosenbaum |
| 5,070,995 A | 12/1991 | Schaffer |
| 5,092,415 A | 3/1992 | Asano |
| 5,133,212 A | 7/1992 | Grills et al. |
| 5,161,628 A | 11/1992 | Wirth |
| 5,172,900 A | 12/1992 | Uno |
| 5,259,607 A | 11/1993 | Hironori |
| 5,303,913 A | 4/1994 | Trouquilla |
| 5,308,932 A | 5/1994 | Manduley |
| 5,383,392 A | 1/1995 | Kowalewski |
| 5,393,939 A | 2/1995 | Nasuta, Jr. |
| 5,465,662 A | 11/1995 | Keung |
| 5,480,085 A | 1/1996 | Smithe |
| 5,499,810 A | 3/1996 | Tranquilla |
| 5,524,878 A | 6/1996 | Trouquilla |
| 5,547,034 A | 8/1996 | Wurz |
| 5,606,913 A | 3/1997 | Kowalewski |
| 5,689,092 A | 11/1997 | Wurz |
| 5,717,167 A | 2/1998 | Filing et al. |
| 5,767,452 A | 6/1998 | Yankloski |
| 5,850,057 A | 12/1998 | Veillette |
| 5,850,757 A | 12/1998 | Wierenga |
| 5,856,637 A | 1/1999 | Vande Berg |
| 5,869,092 A | 2/1999 | Hays |
| 5,879,000 A | 3/1999 | Kakuta |
| 5,902,964 A | 5/1999 | Solberg, Jr. |
| 5,939,646 A | 8/1999 | Fowler |
| 5,959,257 A | 9/1999 | Campbell |
| 5,998,742 A | 12/1999 | Liu |
| 6,141,883 A | 11/2000 | Mitchell |
| 6,268,573 B1 | 7/2001 | Hartselle, III |
| 6,274,002 B1 | 8/2001 | Rulis |
| 6,276,421 B1 | 8/2001 | Valenti |
| 6,370,467 B1 | 4/2002 | Kimbrough |
| 6,428,639 B1 * | 8/2002 | Oldenburg ............... B65C 3/08 156/351 |
| 6,464,219 B1 | 10/2002 | Yee |
| 6,497,522 B2 | 12/2002 | Wotton |
| 6,498,442 B2 | 12/2002 | Hara |
| 6,752,189 B2 * | 6/2004 | Oldenburg ............... B65C 3/08 156/361 |
| 6,820,873 B2 | 11/2004 | Kulpa |
| 6,839,694 B2 | 1/2005 | Kasmin |
| 6,922,025 B2 | 7/2005 | Smith |
| 6,940,025 B1 | 9/2005 | Salomon |
| 7,014,187 B2 | 3/2006 | Mayerberg, II |
| 7,047,827 B1 | 5/2006 | Mithal |
| 7,096,152 B1 | 8/2006 | Ong |
| 7,182,334 B2 | 2/2007 | Spence |
| 7,241,955 B2 | 7/2007 | Hebenstreit |
| 7,271,352 B2 | 9/2007 | Rabindran |
| 7,297,879 B2 | 11/2007 | Salomon |
| 7,405,368 B2 | 7/2008 | Beck |
| 7,550,681 B2 | 6/2009 | Wang |
| 7,687,727 B2 | 3/2010 | Turner |
| 7,779,956 B2 | 8/2010 | Breed |
| 7,820,923 B1 | 10/2010 | Daboub |
| 7,832,545 B2 | 11/2010 | Giffin |
| 7,838,781 B2 | 11/2010 | Streder |
| 7,842,892 B2 | 11/2010 | Wang |
| 7,926,647 B2 | 4/2011 | Fourney |
| 8,106,315 B2 | 1/2012 | Turner |
| 8,129,635 B2 | 3/2012 | Turner |
| 8,133,147 B2 | 3/2012 | Scekic |
| 8,148,650 B2 | 4/2012 | Sye |
| 8,153,911 B2 | 4/2012 | Turner |
| 8,178,796 B2 | 5/2012 | Allen |
| 8,399,764 B2 | 3/2013 | Klosky |
| 8,481,870 B2 | 7/2013 | Turner |
| 8,481,871 B2 | 7/2013 | Turner |
| 8,530,762 B2 | 9/2013 | Turner |
| 8,530,764 B2 | 9/2013 | Monti |
| 8,981,919 B2 | 3/2015 | Massey |
| 8,987,613 B2 | 3/2015 | Turner |
| 8,989,971 B2 | 3/2015 | Dell' Eva |
| 8,991,265 B2 | 3/2015 | Dekker |
| 9,018,544 B2 | 4/2015 | Turner |
| 9,091,585 B2 | 7/2015 | Turner |
| 9,146,148 B2 | 9/2015 | Turner |
| 2002/0053886 A1 | 5/2002 | Hara |
| 2002/0060040 A1 | 5/2002 | Rulis |
| 2002/0066649 A1 | 6/2002 | Grubbs |
| 2003/0034111 A1 * | 2/2003 | Oldenburg ............... B65C 3/08 156/64 |
| 2003/0047425 A1 | 3/2003 | Lessard |
| 2003/0052035 A1 | 3/2003 | Dickinson |
| 2003/0163270 A1 | 8/2003 | Opitz |
| 2003/0227268 A1 | 12/2003 | Smith |
| 2004/0202878 A1 | 10/2004 | Vidal |
| 2004/0245071 A1 | 12/2004 | Giffin |
| 2005/0038588 A1 | 2/2005 | Shukla |
| 2005/0139526 A1 | 6/2005 | Wilke |
| 2005/0205307 A1 | 9/2005 | Salomon |
| 2005/0247542 A1 | 11/2005 | Salvoni |
| 2005/0267848 A1 | 12/2005 | Kenbeek |
| 2006/0044268 A1 | 3/2006 | Robin |
| 2006/0113129 A1 | 6/2006 | Tabata |
| 2006/0278443 A1 | 12/2006 | Salgo |
| 2007/0045944 A1 | 3/2007 | Ban |
| 2007/0215663 A1 | 9/2007 | Chongson |
| 2007/0272450 A1 | 11/2007 | Skinner |
| 2008/0042340 A1 | 2/2008 | Linder |
| 2009/0008218 A1 | 1/2009 | Fourney |
| 2009/0017880 A1 | 1/2009 | Moore |

(56) References Cited

U.S. PATENT DOCUMENTS

| | | |
|---|---|---|
| 2009/0071728 A1 | 3/2009 | Turner |
| 2009/0090599 A1 | 4/2009 | Fourney |
| 2009/0216487 A1 | 8/2009 | Streder |
| 2010/0006346 A1 | 1/2010 | Turner |
| 2010/0082389 A1 | 4/2010 | Turner |
| 2010/0163368 A1 | 7/2010 | Duchemin |
| 2010/0282521 A1 | 11/2010 | Turner |
| 2010/0294572 A1 | 11/2010 | Turner |
| 2011/0004441 A1 | 1/2011 | Turner |
| 2011/0005648 A1 | 1/2011 | Sa |
| 2011/0031683 A1 | 2/2011 | Asari |
| 2011/0043537 A1 | 2/2011 | Dellon |
| 2011/0049800 A1 | 3/2011 | deJong |
| 2011/0272197 A1 | 11/2011 | Mekid |
| 2011/0290569 A1 | 12/2011 | Turner |
| 2012/0139984 A1 | 6/2012 | Lang |
| 2012/0166362 A1 | 6/2012 | Turner |
| 2012/0181091 A1 | 7/2012 | Lieu |
| 2012/0270599 A1 | 10/2012 | Mori |
| 2012/0285751 A1 | 11/2012 | Turner |
| 2013/0126533 A1 | 5/2013 | Klosky |
| 2013/0207451 A1 | 8/2013 | Ohkubo |
| 2013/0224355 A1 | 8/2013 | Bernhardt |
| 2013/0239648 A1 | 9/2013 | Turner |
| 2014/0131120 A1 | 5/2014 | Horst |
| 2014/0224551 A1 | 8/2014 | Turner |
| 2014/0318874 A1 | 10/2014 | Moses |
| 2015/0225179 A1 | 8/2015 | Araki |
| 2017/0052057 A1 | 2/2017 | Turner |

FOREIGN PATENT DOCUMENTS

| | | |
|---|---|---|
| EP | 2195621 A1 | 6/2010 |
| EP | 2032339 A1 | 3/2011 |
| EP | 2400276 A1 | 12/2011 |
| SE | WO 9002927 | 3/1990 |
| WO | 2007/031176 A1 | 3/2007 |
| WO | 2009/036251 A1 | 3/2009 |

OTHER PUBLICATIONS

International Bureau, International Preliminary Report on Patentability, Chapter I of the PCT, for Application No. PCT/US2008/076140, International Filing Date Sep. 12, 2008, dated Mar. 25, 2010.

International Searching Authority USPTO; International Search Report and Written Opinion for PCT/US2008/076140; dated Jan. 7, 2009; 14 pages.

European Patent Office, European Search Report for Application No. 09252332.3-2213, dated Dec. 3, 2009; 7 pages.

Schwabe Williamson & Wyatt, PC List of Related Matters dated Nov. 18, 2016; 2 pages.

Extended European Search Report dated Aug. 13, 2013, for related European Patent Application No. 13167924.3 filed on May 15, 2013; 5 pages.

Extended European Search Report dated Sep. 11, 2013, for related European Patent Application No. 112504593.2 filed on Apr. 11, 2011; 6 pages.

International Search Report and Written Opinion for PCT/US2016/060838 dated Feb. 8, 2017; 10 pages.

\* cited by examiner

SCALE FOR WEIGHING PARCELS

RELATED APPLICATIONS

This application is a divisional of co-pending U.S. patent application Ser. No. 14/267,454, filed May 1, 2014, which claims priority, under 35 U.S.C. §119, to U.S. Provisional Patent Application 61/819,857, filed May 6, 2013, and to U.S. Provisional Patent Application 61/894,802, filed Oct. 23, 2013, all of which are incorporated herein by reference in their entirety.

COPYRIGHT NOTICE

©2015-2016 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The following information relates to the use of precision servo technology in detecting the mass of items while they are moving.

BACKGROUND OF THE INVENTION

An electric servo system in general may comprise an electric motor and a servo amplifier connected in a negative feedback configuration. Referring to FIG. 1, for example, a motor 10 is driven by a variable power supply 12. A servo amplifier 14 controls the power supply 12. A third system element known as a servo controller 20 issues motion commands to the servo amplifier 14 which in turn directs the power supply 12 to generate motor drive current and monitors the resulting position and velocity of the motor via path 22. The amplifier 14 detects the error between the commanded and actual position and/or velocity of the motor and generates compensating signals, path 24. These types of systems are used in a vast array of modern technologies ranging from simple coffee makers to advanced robotics and spacecraft.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

A method for weighing parcels while they are moving, in one embodiment comprises the steps of (a) driving a conveyor at an initial non-zero velocity; (b) receiving a parcel on the moving conveyor; (c) accelerating the conveyor and the parcel during a weighing period of time; (d) acquiring torque sensing signals generated in a servo system that is configured to drive the conveyor during the weighing period; and (e) calculating a mass of the parcel based on the torque signals. This method, based on constant acceleration, can be used to weigh a stream of parcels, overlapping on the conveyor or not, up to around 50 kg mass each.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
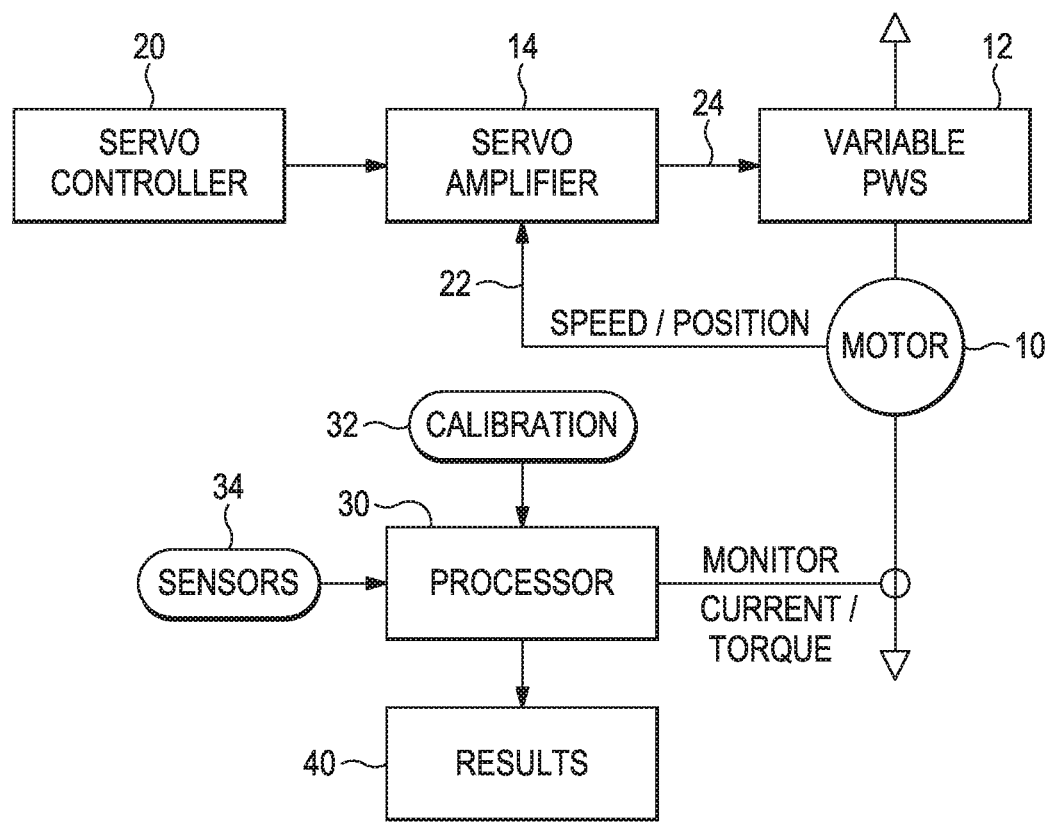
FIG. 1 is a simplified schematic diagram illustrating a known servo system.

The concept of using servo acceleration to detect mass of a small moving object is the subject of previous work such as my U.S. Pat. No. 7,687,727 (and European Patent No. 2195621), incorporated herein by this reference. FIG. 1, introduced above, is taken from that patent. In this prior art, the general principle involves subjecting mail pieces to a step function change in velocity created by a servo system, and then monitoring the behavior of the servo (specifically the torque impulse generated) as it compensates for the change in system mass and velocity as a mail piece is introduced. The basic servo loop shown in FIG. 1 was described in the background. FIG. 1 also illustrates how a digital processor 30 can be provisioned to monitor and process the motor torque information, and compare it to calibration data 32, to generate results 40 representing the mass of a moving mail piece. Sensors 34 may be provided to inform the processor as the moving mail pieces enter and leave a weighing station. This step/impulse model works well in applications where the articles to be weighed are of low mass (typically less than 112 grams) and are moving at high speed (for example, 4 m/s). The prior art is not suitable for weighing larger (heavier) objects such as parcels while they are moving, or weighing granular solids or slurry materials while they are moving.

A new model emerges as a servo-controlled acceleration concept is applied to requirements involving articles ranging up to 50 kg moving a lower speed than those described above. In these cases, we have discovered a solution that implements a constant acceleration model. The calculations for time varying velocity and position are quite straightforward and derive from the concepts of classical mechanics. Because off-the-shelf servo technology typically accepts only velocity and position commands, the time varying velocity command must be synthesized outside of the servo based on the desired constant acceleration.

Generally, the actual torque generated by the servo system in this new model is not directly controlled by the external source of the velocity command. The torque signal is generated only by the servo amplifier and is derived from the error signal (feedback) or difference between the commanded and actual velocity of the servomotor over time. An example is given below with regard to FIG. 3. The generated torque signal will be variable and correlated with the total system mass driven by the motor. Since the total system mass will include a variable element (the article to be weighed) the torque signal is monitored to calculate the mass of the article. FIG. 1 describes the behavior of the servo system under varying mass conditions.

Figure 2A:
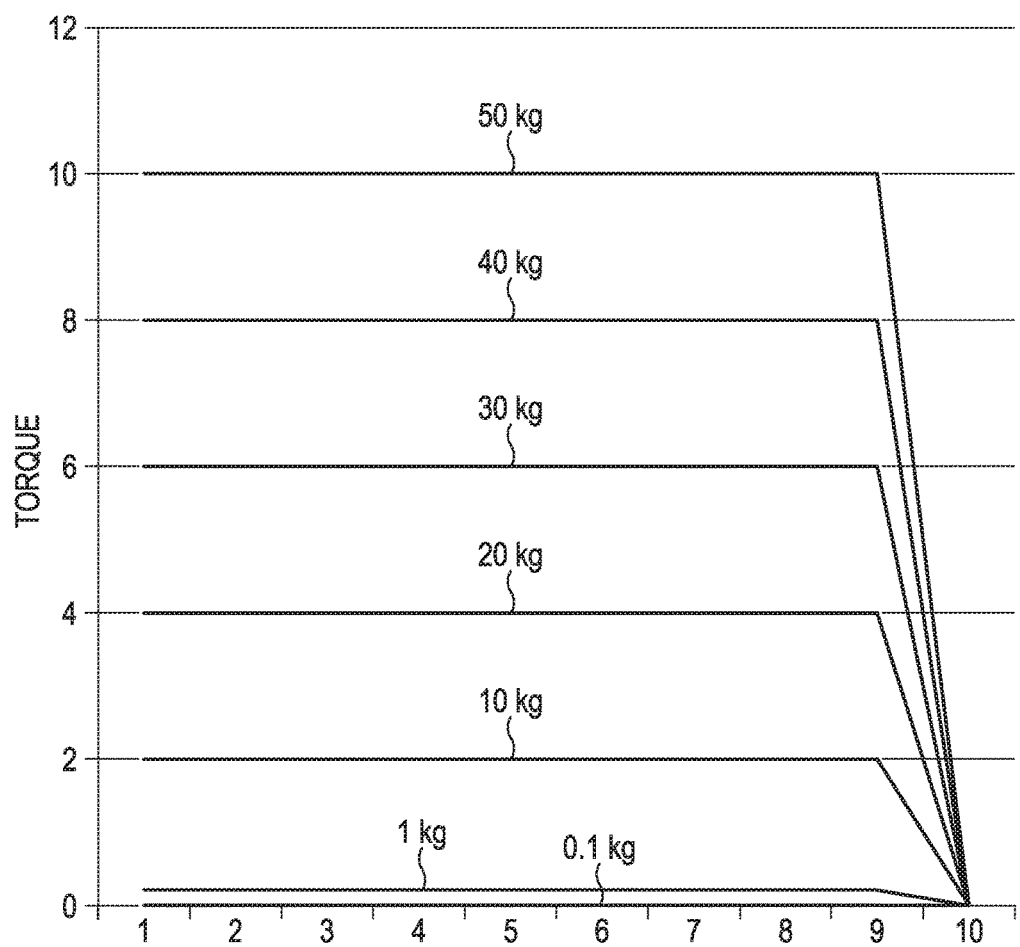
FIG. 2A is a graph that illustrates time-variable generated torque signal values responsive to a constant acceleration command under various mass conditions in a weighing system.

FIG. 2A illustrates the variable torque generated by the servo system in response to a constant acceleration command. Since the acceleration is constant and the mass is constant (for each discrete measurement), then the force or rotational force (torque) is also constant over time. The return to zero above occurs when the weighing operation is terminated.

In the above example for a mass of 50 kg and an acceleration of 4 m/s^2, a linear force of 200 Newtons is required. If a weighing machine mechanism involving rollers has an effective radius of 50 mm, the torque reflected at the servo motor will be 200 Newtons*0.05 m=10 Nm. In practicality, these torque signals will include electrical and mechanical noise and friction elements that should be filtered or compensated.

As can be seen in FIG. 2A, the mass of each article can be directly calculated from the vertical amplitude of the servo torque signal. The actual duration of the acceleration command is not directly relevant to the mass measurement but will be influenced by external factors such as noise filtering requirements and the speed of the conveyor system for example. An important advantage of using a constant acceleration model is that velocity and position change over time is also constant for all articles regardless of weight. This is useful in maintaining tight separation of articles in high throughput processing systems.

Figure 2B:
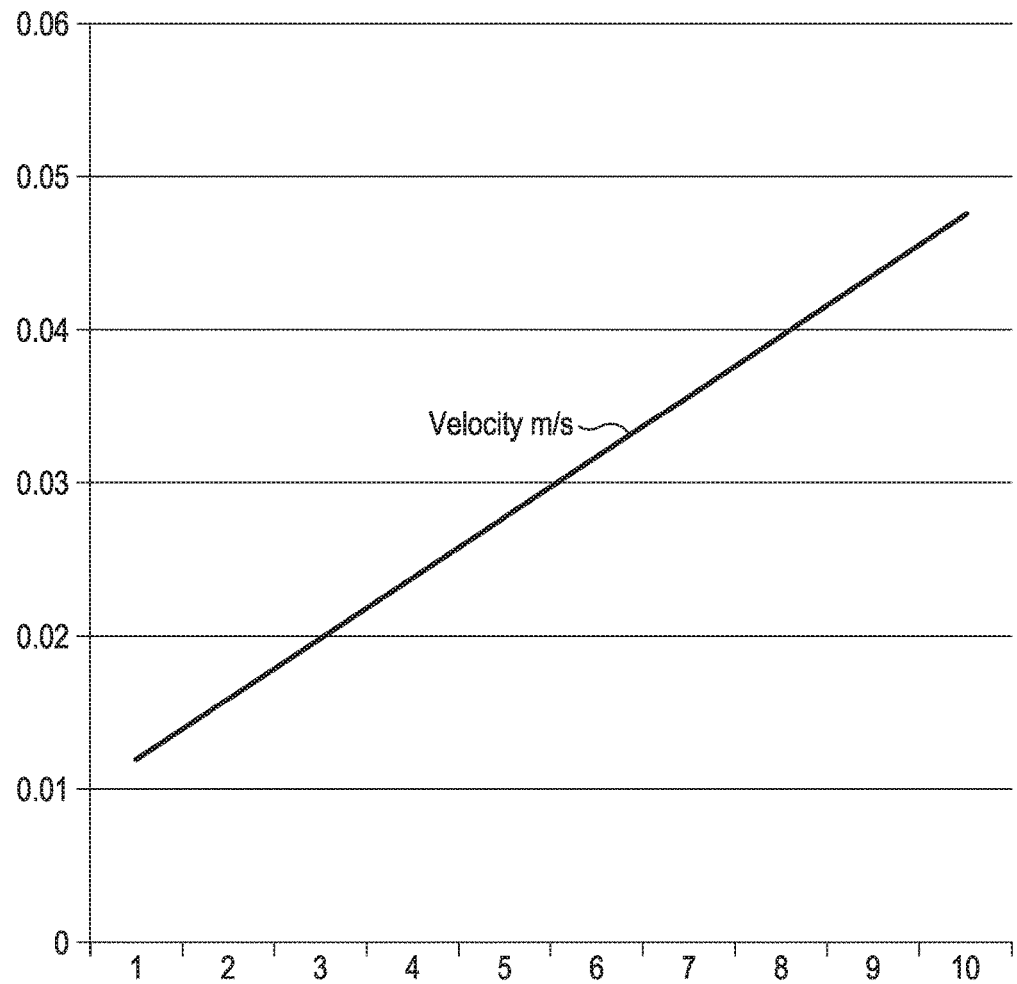
FIG. 2B is a graph that illustrates a linear time-varying velocity curve.

In the graph of FIG. 2B, it is seen that a velocity change of 0.04 meters/second, for example, occurs over an interval of 0.01 seconds for an acceleration of 4 m/s^2 as described previously. Again, this velocity change is constant for all articles regardless of mass because the servo system maintains a tight feedback loop varying the torque to ensure that the acceleration command is met.

Figure 2C:
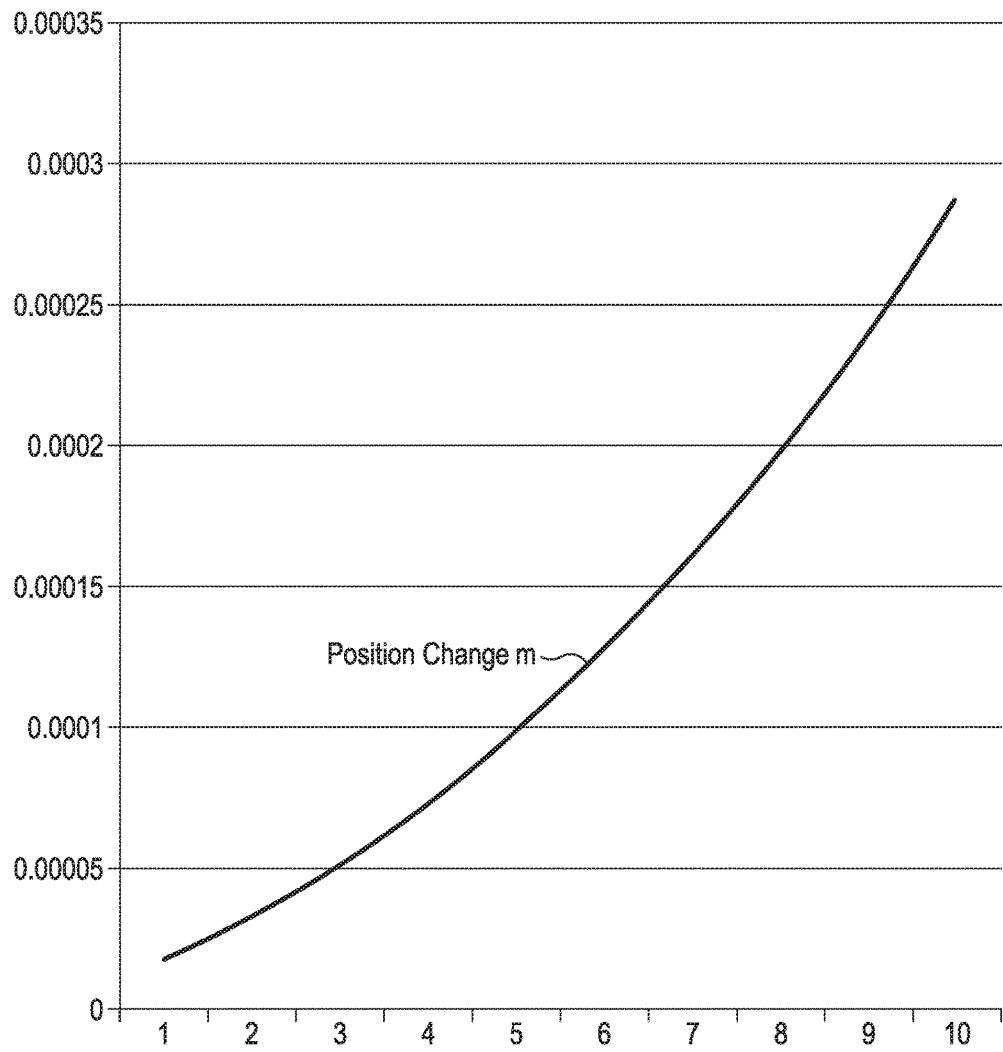
FIG. 2C is a graph that illustrates change in position over time responsive to a constant acceleration command.

Finally, referring to FIG. 2C, the position versus time of the article in the weighing apparatus is constant for all masses because acceleration is constant and velocity changes at a constant rate for all articles. The position change due to acceleration alone is shown in the graph; it follows a parabolic curve or acceleration*time ^2 as expected.

It is important to clarify how modern servo systems can be controlled in dynamic weighing applications. Typically, servo systems can accept one of three inputs for controlling the motion of the motor and driven apparatus. These include torque, velocity or position commands. Each mode has specific limitations and suitability to individual application. Servo systems generally employ two distinct feedback paths. These are the velocity and position loops. A description of each mode is as follows:

1—Torque command mode. In this mode both the velocity and position feedback loops are open and no feedback of any kind is used. The torque signal sent to the motor is directly controlled by an outside controller with no correction for any velocity or position error. In fact, a servo system running in torque command mode is not a servo at all since the word servo implies feedback error correction.

See: http://en.wikipedia.org/wiki/Servomechanism. A servo system in torque command mode is little different from a dumb electric motor. Any weighing application describing a commanded torque signal e.g. ramping, constant or other is effectively operating the servo in open loop mode thereby defeating any gain associated with servo technology. It should also be noted that a servo system configured to operate in open loop mode (torque command mode) is capable only of a natural response and forgoes any benefit of feedback such as gain/bandwidth trade off. The end result is a slow response to motion commands which prevent application to high speed applications such as parcel sorter systems operating at 3 m/s.

2—Velocity command mode. In this mode the servo velocity loop is closed and error signals resulting from the difference between the commanded and actual velocity are conditioned and amplified to drive a resulting torque signal to the motor. In this mode the torque signal derives only from the error calculations in the servo amplifier. The velocity command signal can be an analog or digital data from an external controller. This is a true servo mode with applications such as conveyor, motion control or similar systems.

3—Position command mode. In position mode, both the velocity and position loops are closed. This is another true servo mode and is used in applications where precise positioning is needed. The input for position mode is frequently called "step and direction" which provides a backward compatibility with stepper motor system controllers. Applications for position mode servos include robotic assembly systems.

The parcel scale systems described in this document makes use of either velocity or position mode control. This is a true servo use model. The servo system accepts a time varying velocity or position command similar to those described above although other time varying velocity or position signals can also be used and should be considered within the scope of this patent application. As a first example, a linear time varying velocity command signal is used. The servo velocity loop is closed and the position loop is open. A linear time varying velocity signal implies by its nature a constant acceleration of a magnitude equal to the slope of the velocity command signal.

In this example, the velocity signal will start with an initial value to spin the scale mechanism at a speed matching the in feed and out feed conveyor systems upstream and downstream from the scale. When an article is detected in contact with the scale roller or belt, the velocity signal will be commanded by an external controller to change speed at a linear rate with respect to time and as a result, a constant acceleration of the mechanism and article to be weighed will occur (4 m/s^2 in the diagrams above although it could be any practical value including negative values). The servo system will respond to the changing velocity command by changing the torque drive signal to the servomotor. The servo system will concurrently monitor the speed of the servomotor and generate an error signal proportional to the difference between the commanded and actual velocity of the motor. The error signal is conditioned and filtered by the servo amplifier and used to generate a new torque signal. This operation typically occurs several thousand times a second. When the weigh operation is complete, the servo returns the motor and driven mechanism to the initial speed setting.

Figure 3:
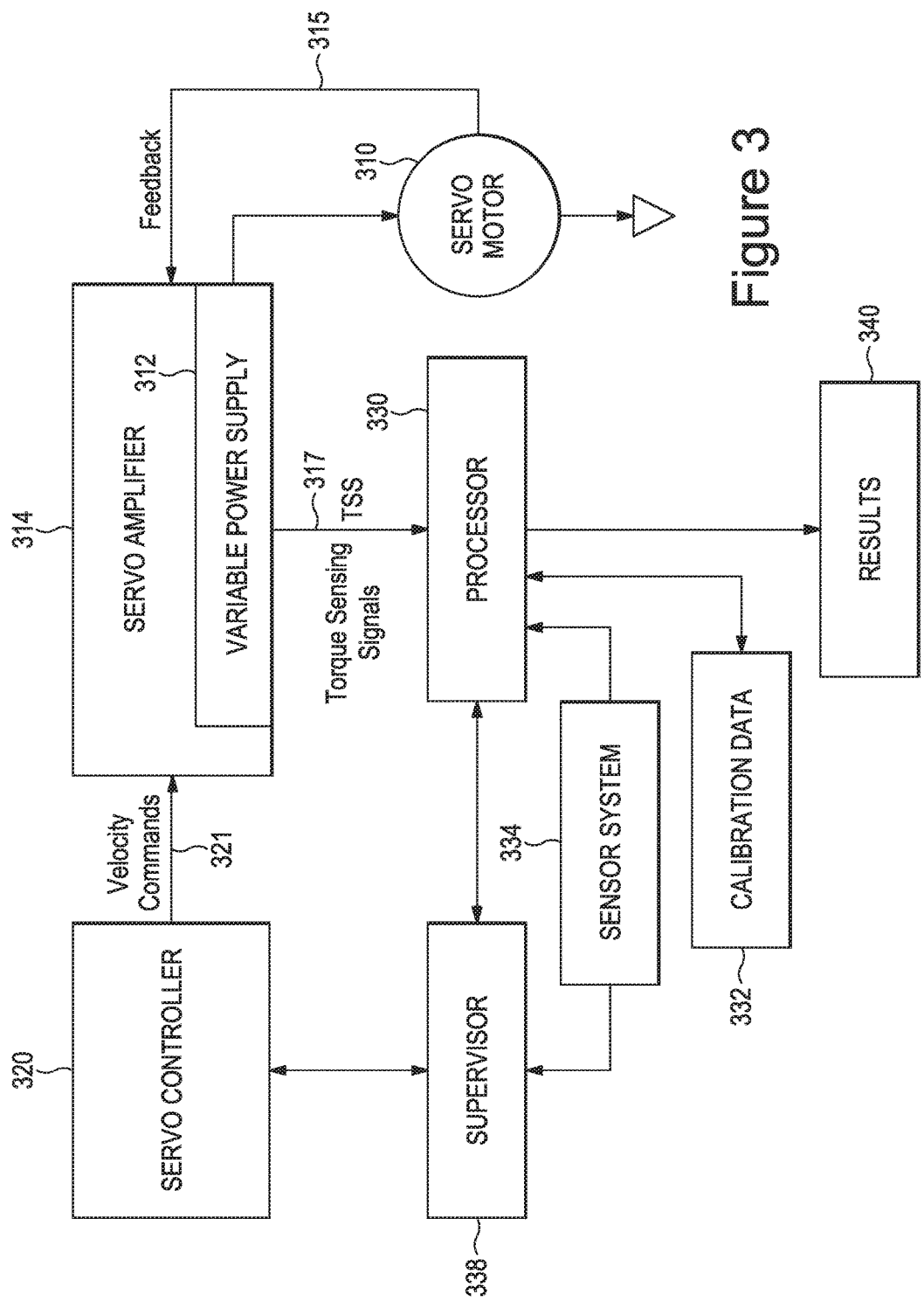
FIG. 3 is a simplified system block diagram illustrating principal control and data signals in an example of a servo-based acceleration weighing system.

FIG. 3 is a simplified system block diagram illustrating principal control and data signals in an example of a servo-based acceleration weighing system. Here, an accelerator conveyor (not shown) is arranged to receive a moving item. A sensor or sensor system 334 may be provided to detect the arrival of a moving item onto the accelerator conveyor. A servo motor 310 is arranged to drive the accelerator conveyor. A variable power supply 312 is arranged to power the servo motor. A servo amplifier 314 is arranged to generate a torque signal to control the variable power supply.

In this embodiment, a servo controller 320 is coupled for commanding the servo amplifier; wherein the servo controller is arranged to first command an initial velocity of the servo motor 310, to then to input a time-varying velocity command 321 to the servo amplifier so as to accelerate the servo motor 310, responsive to the sensor system detecting an item present on the accelerator conveyor. The time-varying velocity command 321 may be linear, as illustrated in FIG. 2B. The velocity command(s) may take the form of analog or digital data. Item detection, or a "start weighing" command, may be generated by a supervisory process or processor 338 in some applications.

A speed or position sensor (not shown) may be coupled to the servo motor 310 or to the conveyor itself and arranged to provide feedback signals 315 to the servo amplifier 314 responsive to operation of the motor 310. Speed (velocity) or (rotational) position of the motor may be reported. Various means such as encoders for sensing speed or position of motors are known.

In the case of a velocity sensor, the servo amplifier may be configured to compare the feedback signals 315 to the time varying velocity command 321 while the item is present on the accelerator conveyor, to form an error signal. The error signal is converted to generate a time-varying torque sensing signal 317 responsive to the comparison. The generated torque sensing signal 317 preferably is responsive to a total system mass driven by the servo motor (typically including the conveyor and item(s) riding on the conveyor). In an embodiment, a processor 330 may be configured to determine a mass of the item based on the generated torque sensing signal.

Since the acceleration is commanded to be constant via the linear time varying velocity command 21, the force or torque (for rotational systems) is proportional to the mass of the article to be weighed via the equation: (Torque/roller radius)=Mass of article*Commanded acceleration (which is constant for all articles). It is thus that the torque signal generated by the servo amplifier in response to the commanded constant acceleration of an unknown mass is monitored to calculate that mass. An example of these torque signals can be seen in the first graph above in FIG. 2A.

In some embodiments, a calibration function may be used. Setting a calibration function for the accelerator scale may comprise the following steps:
1—Run the scale with items of identical weight e.g. 1 Kg on multiple passes.
2—Calculate an average of variable torque measurements for the multiple passes. "Variable torque" reflects the force required to accelerate each article. Variable torque excludes the constant torque required to spin the underlying system machine with no acceleration.
3—Repeat step the previous steps with another set of identical mass articles e.g. 30 Kg.
4—Since the fundamental relationship of mass and force is linear i.e. f=ma, two simultaneous equations can be generated to calculate the offset and slope of the mapping of torque to mass from this calibration data. Calibration data may be stored and read at memory 332 by the processor 330.

As an example of the above process, if the linear equation for the 1 Kg article is: 10 Kg=m(slope or gain)*(dynamic torque average)+b(offset), a second similar equation is generated for the 30 Kg article. Isolating one factor, m or b and then substituting into the other equation yields the other factor. All variables are then known. The m and b factor and term are then used in the linear equation to map the dynamic torque measurements to the mass of any articles. Referring once again to FIG. 3, is some systems, the calibration results may be stored at 332 and used by the processor 330 as explained to determine and report results 340.

In some embodiments, signal processing (DSP) may be used to separate constant and variable torque elements in the composite torque waveform. For example the 0th harmonic or "DC" value of the waveform derives from the first basis function of the Discrete Fourier transform (DFT). This value corresponds to the constant torque required to move the mechanism with no additional mass. This is used to subtract the constant torque from the variable torque in several measurement models. The 1st basis function represents the "fundamental" frequency or the lowest variable frequency of the torque waveform. This assumes the sample period is identical to the period of the variable torque waveform. This value is the amplitude of the variable torque waveform and corresponds to the force required to accelerate a variable mass which of course is the theory for the operation of the accelerator scale. The remaining basis functions (harmonics) of the DFT may be used in generating filtering functions to "clean up" the variable toque measurement and detect malfunctions, etc. These calculations may be performed by a general purpose processor or by a dedicated DSP processor.

Figure 6:
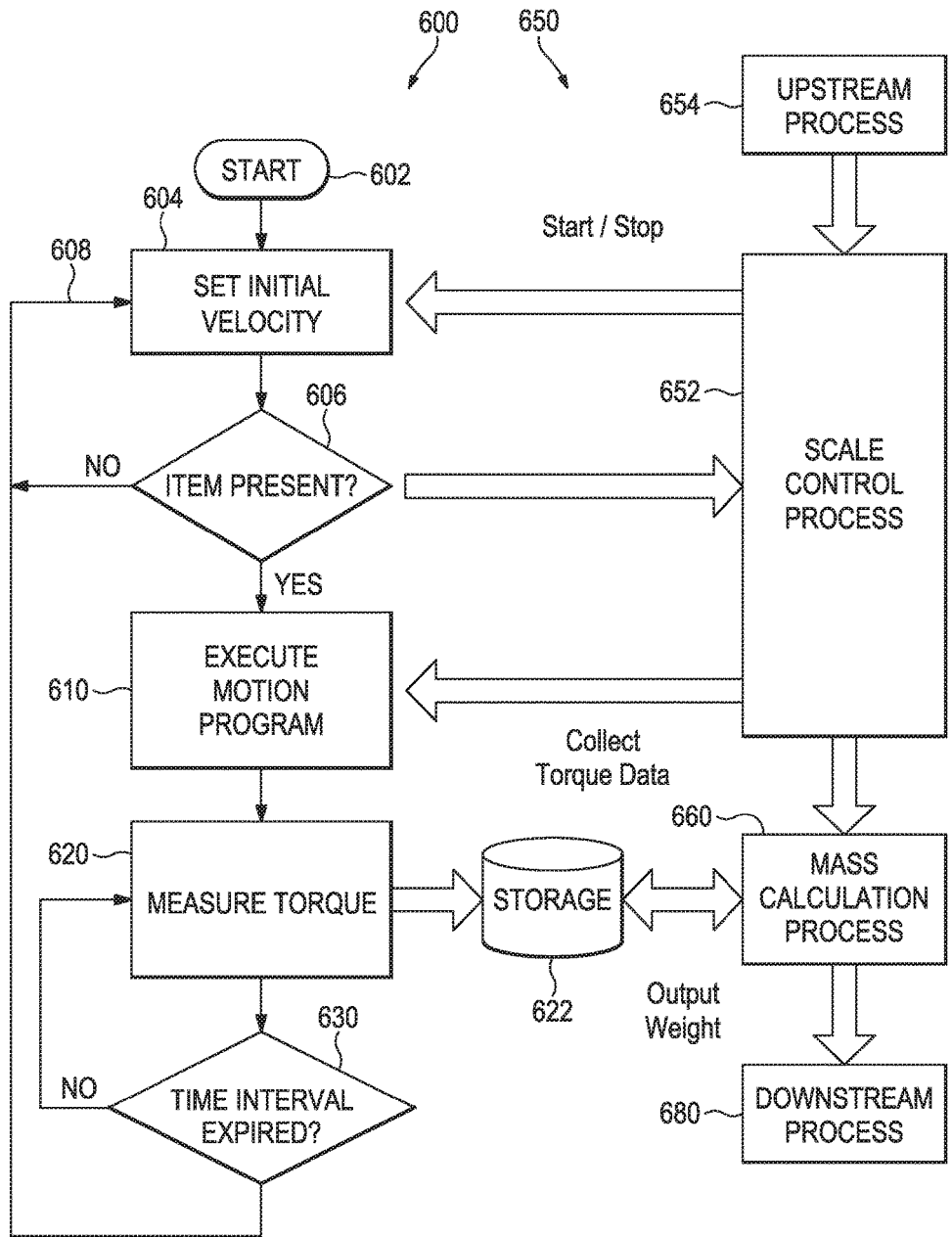
FIG. 6 is a simplified flow diagram of a system and method for weighing moving items or materials on a conveyor.

FIG. 6 is a flow chart describing the general process used by an accelerator scale system in some applications. On the left side is the process flow 600 executed primarily by a servo system. The right side 650 includes both the scale system controller 652 and any upstream 654 or downstream processes 680, or other systems that integrate the scale system. In the process 600, after startup, the servo is set to a selected initial velocity, block 604. For example, the initial velocity may be commanded by a servo controller as illustrated in FIG. 3, velocity command 21. The conveyor therefore is moving at an initial, preferably constant, velocity. The initial velocity may be matched to an incoming conveyor (see 800 in FIG. 8A). It may be set or commanded by a scale control process 652.

When an item is detected, entering or upon the weighing conveyor, decision 606, a sensor system, for example, notifies the scale control process 652, and the control process begins the weighing process by commanding a constant acceleration, block 610. As mentioned, this may be realized using a servo controller in the embodiment of FIG. 3. Prior to an item entering the system, the process loops via path 608 in a waiting or standby mode. Returning to block 610, the constant acceleration begins, and torque measurements are acquired, block 620, and stored in a memory 622. The process may continue to acquire torque measurements until a time interval is expired, decision 630. At that time, the process loops back to 604 to return to an initial velocity.

The scale control process 652 may invoke or itself may implement a mass calculation process 660. The mass calculation process accesses the stored torque measurements 622, and based on those measurements produces output weight data, which may be provided to a downstream process 680. The weight data also may be stored at 622. Acquired torque sensing data may be converted to mass measurements utilizing the calibration data, or in other embodiments, utilizing a predetermined linear mapping.

Figure 4:
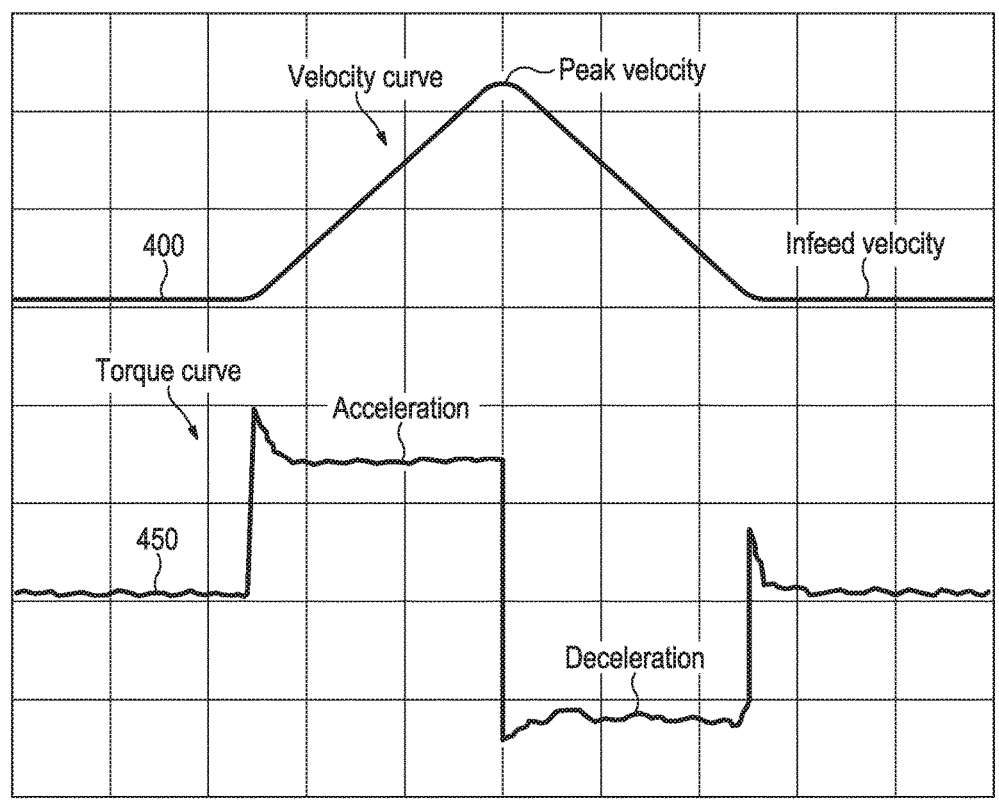
FIG. 4 represents an oscilloscope display of a velocity curve trace and a corresponding torque sensing signal during operation of a weighing system of the type illustrated in FIG. 3.

FIG. 4 represents an oscilloscope display of a velocity curve trace 400 and a corresponding torque curve trace 450, also called a torque sensing signal. These curves may result from operation of a weighing system of the type illustrated in FIG. 3. In the figure, the graticule may represent, for example, a scale of 1 volt per division in the vertical dimension, and 50 msec per division along the horizontal axis. In the torque curve 450, the region marked "Acceleration" may be used to acquire a weight measurement. However, also using the "Deceleration" portion provides a greater dynamic range and thus is likely to improve accuracy.

A constant torque force will produce a linear ramp change in velocity (curve 400—constant acceleration). The underlying theory is simply F=ma. If acceleration is held constant for all masses, then the force (torque in this case) will vary proportionally to the mass being accelerated. If the variable torque generated by the closed loop servo in response to the disturbance (mass change) is measured, the magnitude of that mass can be inferred from that measurement.

Figure 5:
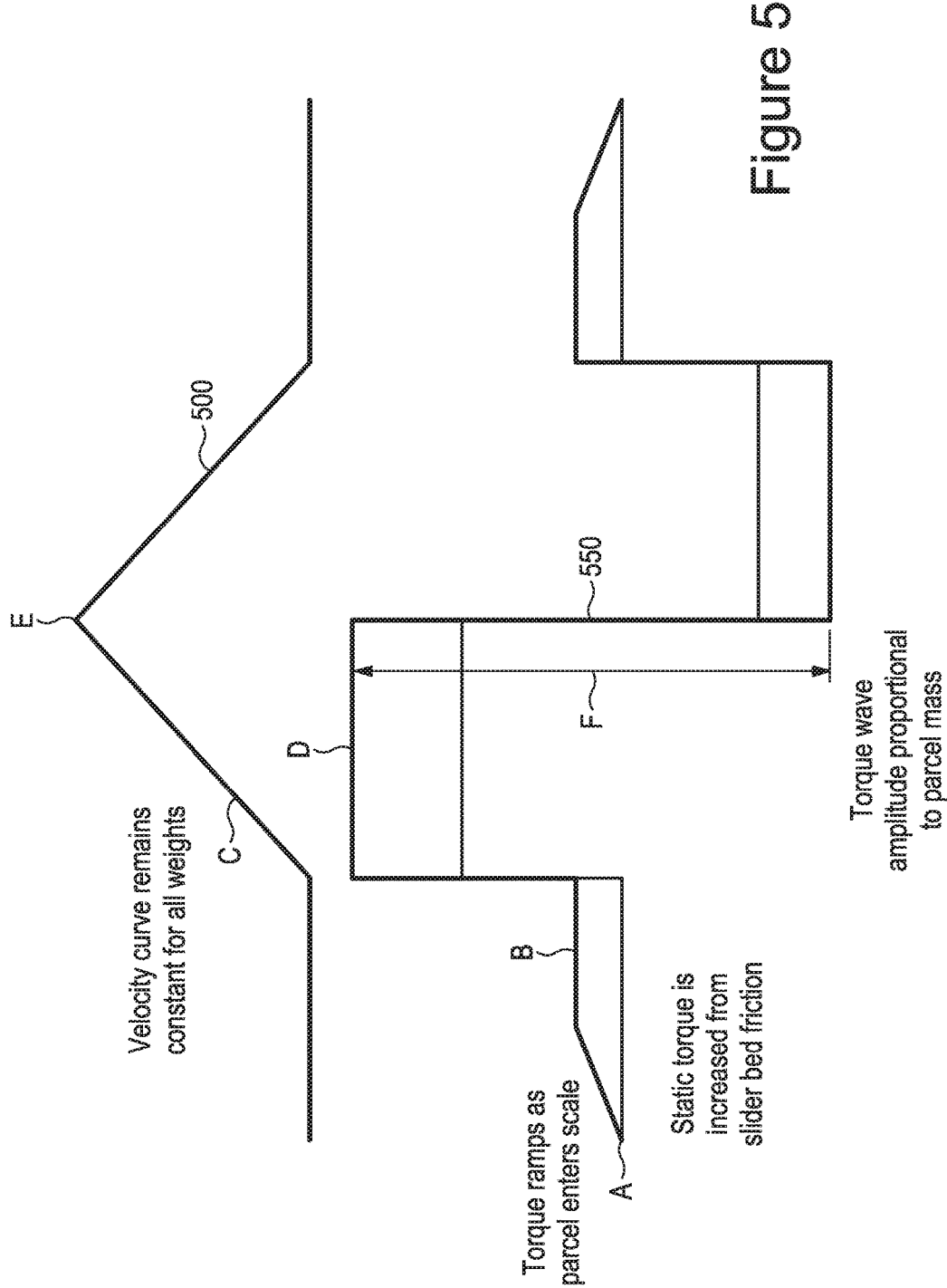
FIG. 5 is an idealized example of a velocity curve and a corresponding torque curve further illustrating operation of an accelerator scale system.

FIG. 5 is an idealized illustration of behavior of the acceleration scale with traces tracking velocity and torque. The top curve 500 represents velocity (of the drive motor), and the lower curve 550 represents torque, illustrating the behavior of the scale when a variable mass is introduced at a time "A." The two curves are roughly aligned with respect to time. As indicated, torque ramps up as a parcel or other item enters the scale. It then remains constant, region B, as the commanded velocity is constant. When the commanded velocity ramps up at C, the torque waveform jumps up to D, the level necessary to cause the commanded constant acceleration. At the end of a selected time period, the velocity command 500 reverses course and begins to fall from its peak value at E. This results in a corresponding drop in the torque curve 550. The torque wave amplitude, indicated at arrow F, is proportional to the mass of the parcel introduced.

Note that the velocity curve 500 will not change significantly due to introduction of one or more items onto the weighing conveyor. If it does, it will be due to some slippage of the subject article or torque saturation or both. It is also important that the friction profile of the scale remain predictable. If it is randomized or variable by parcel dimension, for example, it could prove difficult to separate out of the measurement. Additional calibration measurements and calculations may be used to correct for deterministic variations.

One advantage of the constant acceleration model is that the relative position of one parcel to the next will be unchanged as they leave the scale. This will be a useful behavior as gapping and throughput becomes important, further discussed below. It is also useful to consider behavior at very high speed operation for example 4 m/s and higher. In this case the acceleration could be reversed (deceleration first). The torque waveform during the acceleration period would simply invert and the system would show the same mass measurements.

Weighing Granular and Slurry Materials

Another application of the accelerator weighing technology is that of total accumulated mass as well as the mass flow of solid but granular or slurry type materials. For example, a slurry may comprise a thin mixture of an insoluble substance, as cement, clay, or coal, with a liquid, as water or oil. For present purposes, the slurry must have sufficient viscosity to be moved (accelerated) by a powered conveyance. However, even water may be conveyed with an Archimedes' screw. The screw may be driven by a motor, and the motor in turn controlled by a servo system generally of the type described above. Accordingly, the terms "conveyor" or "conveyance" in this description and the claims should be broadly construed, and are not limited to a conveyor belt type of contrivance.

For granular and slurry applications, we preferably command a constant velocity at the servo controller, so that reported torque signal variations result from new material landing on the conveyor belt. In other embodiments, we may command a time varying velocity function. In general, the torque force applied during the acceleration of solid but granular (grains, frozen vegetables, stone, concrete, nails, ground beef, etc) materials can be summed over a period of time to produce a total mass measurement of a flow of said materials. It is then a simple task to report the mass per unit time delivered by the conveyor for a measurement of mass flow e.g. grams/second. This apparatus would obviate the use of gravity based load cells, EMFR or strain gages and as a result would be suitable for relatively high-speed operation and high throughput.

Figure 7A:
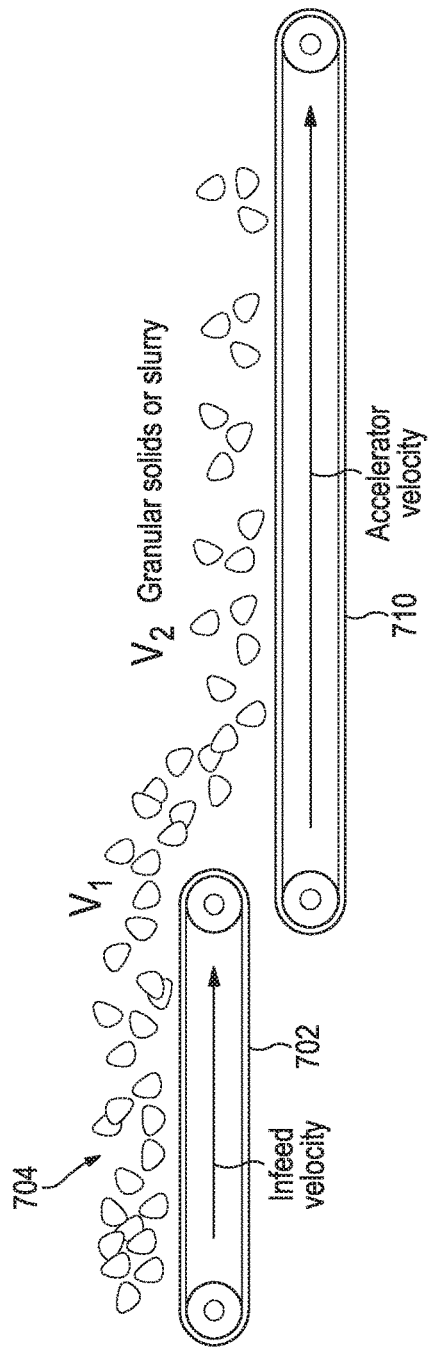
FIG. 7A is a simplified diagram of a conveyor weighing system for weighing moving granular solids or slurry materials.

FIG. 7A illustrates the concept of aggregation or mass flow of material across a conveyor scale. In the top half of the diagram, two conveyor sections may operate at different speeds in one embodiment. A first or infeed conveyor 702 carries material 704 at a first or in-feed velocity. The speed difference preferably is a large difference such as, for example, 0.5 m/s^2. Since the material already resting on the accelerator belt 710 has already been accelerated there is no (or very little) change in momentum for this material. Therefore the previously accelerated material requires no additional force from the servo. Only the material newly arriving from the in feed has a significant change in momentum from coming into contact with the accelerator belt therefore only this material requires force from the servo to accelerate. This force can be measured by sampling the servo torque and mapped to the mass per unit time arriving on the accelerator.

Figure 7B:
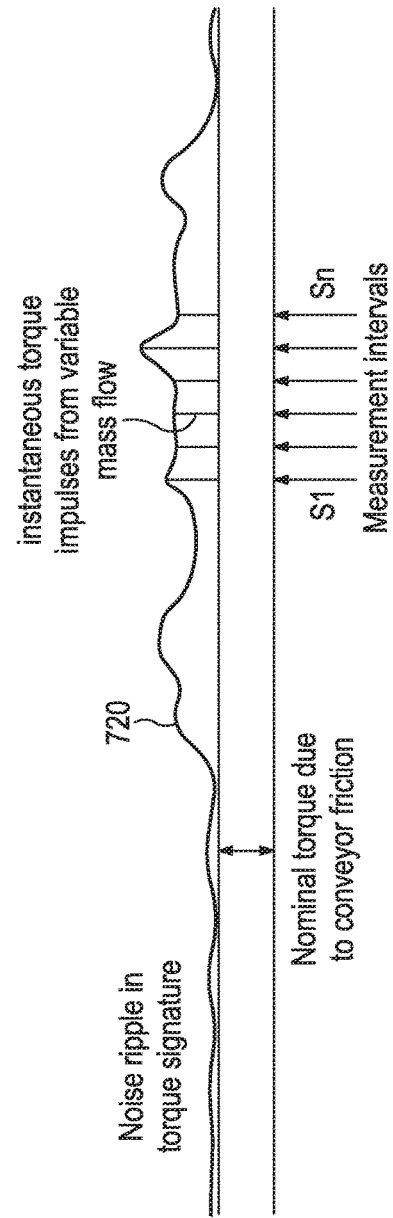
FIG. 7B is a simplified diagram illustrating torque demanded be a servo motor and servo controller to achieve a commanded speed, and illustrating measurement intervals S1-Sn as periods of instantaneous torque measurement resulting from variable mass flow on a conveyor system of the type illustrated in FIG. 7A.

In an embodiment, the accelerator conveyor 710 is driven by a servo motor (see FIG. 3). In FIG. 7B, the torque demanded by a servo motor and servo controller to achieve the commanded speed is illustrated as a signal 720. As illustrated in FIG. 7B, the incremental torque 720 demanded by the servo will only exceed a nominal level while the material is actually accelerating. That is to say that the material 704 is accelerating until it comes to rest at the speed of the accelerator conveyor 710. The material will be moving in sync with the accelerator at this point in time. After the material is moving at the speed of the accelerator and the flow of material from the infeed to the accelerator stops, the torque value will return to the nominal level. (This assumes friction from the additional material mass can be minimized to the point it can be ignored.) In practice, there are friction losses and the material already on the belt 710 does change speed slightly, but these factors are minimized and equated to zero since the newly arriving material has a substantially different momentum that the material previously weighed.

As shown in FIG. 7B, the measurement intervals S1-Sn are periods of instantaneous torque measurement. A total mass measurement can be achieved by summing all impulse values minus the nominal torque value required to overcome the conveyor friction. Mass flow can be measured by taking the average torque of two adjacent samples minus the nominal torque value. This measurement would then be divided by the time span between the measurement intervals to yield a mass per unit time measurement.

One example of a servo motor that may be used in some embodiments is model M-4650 ServoMotor commercially available from manufacturer Teknic of Pittsford, N.Y. One example of a servo controller/driver that may be used in some embodiments is model ISC-1700 Servo Controller/Drive commercially available from manufacturer Teknic of Pittsford, N.Y. These examples are merely illustrative.

Table 1. Parameterized Application Example.

The following example of an embodiment of an accelerator scale is merely illustrative and not intended to be limiting.

In-feed conveyor speed: 2 m/s
Min/Max parcel length: 100/1500 mm
Max parcel weight: 50 kg
Required resolution: +/−100 g
Velocity differential: +0.5 m/s
Nominal acceleration: +4 m/s^2
Total scale length: 1900 mm
Scale roller diameter: 100 mm
Acceleration period: 124 ms
Servo specification:
Max sustained torque: 10 Nm (For weighing purposes only. Suggest 100% over sizing for nominal torque required to spin mechanism)
Torque loop resolution: 16 bits
Torque loop sample rate: 2000 samples/s
RPM range 2400-4800
Servo system requirements:
1—Ability to listen in on torque loop and collect digital torque samples for processing.
2—CAM tooling for setting up simple motion profiles and triggers.

Overlapping Parcels

In a parcel weighing system, one object is to detect the mass of a single (moving) item even if there are other items on the weighing conveyor at the same time. In particular, we next disclose how to do such measurements in high speed, high volume processing systems, although these characteristics are not necessary to operation.

A weighing device can be constructed using the principles of acceleration rather than relying on gravity. A servo motor sensor can be arranged to drive a conveyor of any kind and programmed to change the state of motion of items on that conveyor. The force required to change the state of motion are measured implying the mass of the article to be weighed. These basic concepts are the subject of U.S. Pat. No. 7,687,727 and its progeny. But such systems, as noted earlier, are limited to weighing small, singulated items such as mail pieces.

In the parcel logistics industry, volumes of packages are continuously increasing largely due to the increasing volume of on-line shopping and an ever increasing global trade. The speed of logistics processing systems has continuously increased and will continue to do so in the immediately future. One bottleneck in this process are the automatic weighing devices that are based on the constant and vertical acceleration of gravity, the lengthy settling times of these mechanisms and the floor and machine vibrations that distort the measurements. Another limitation of these systems is the requirement that each item to be weighed must be isolated on the scale at a given time to prevent the corruption of the measurement. If the packages are of variable lengths, a complex mechanism must be developed to ensure the isolation of each package regardless of whether it is 6 or 60 inches in length. A final complication arises when the gap between packages is small, making the mechanical transport design more complex still.

Figure 8A:
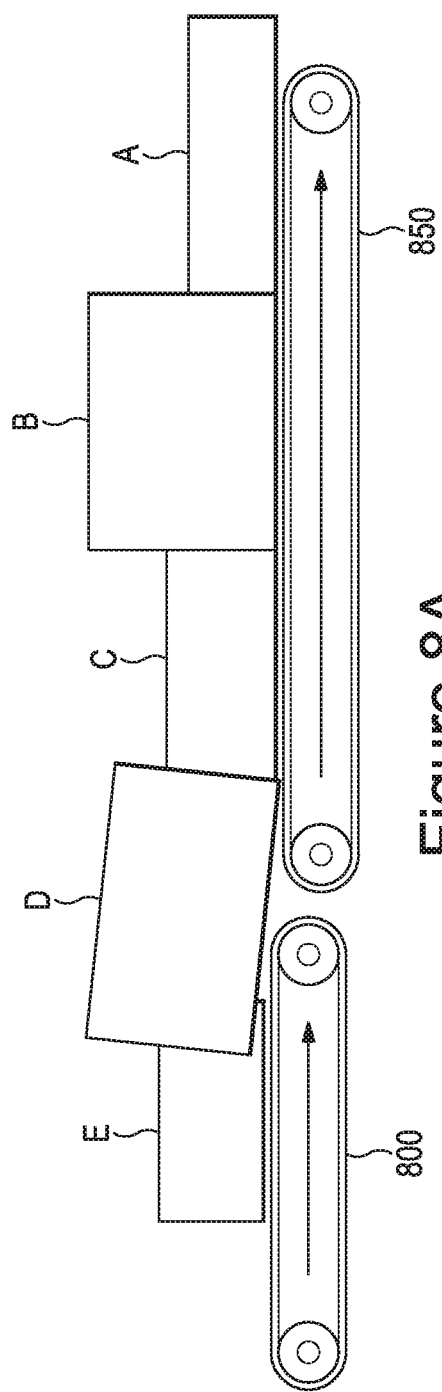
FIGS. 8A-8B illustrates torque measurements responsive to multiple, overlapping objects moving along on an accelerator scale.

FIG. 8A is a simplified diagram of a scale system for weighing multiple, possibly overlapping, moving parcels. A first or infeed conveyor 800 delivers the parcels to a weighing conveyor 850, both moving left to right in the drawing. The infeed conveyor is moving at a first speed. The weighing conveyor accelerates the parcels to a second speed greater than the first speed. (The acceleration may space the parcels apart but that is beside the point and not required.) The weighing conveyor preferably is driven by a servo motor, arranged as part of a closed-loop servo system generally of the type described above. Parcel A arrives first, followed generally by parcels B, C, D and E, although they are overlapping on the conveyor. Therefore, no one item is alone on the conveyor 850 for weighing, as required by conventional systems.

A solution to these complexities is realized if an impulse and momentum approach is used in conjunction with a servo driven accelerator weighing system. We have observed that regardless of the mass (parcels) already on the accelerator belt, the impulse required to accelerate the Nth package is the same as if there were no packages on the belt. Intuitively one would suppose that a newly arriving package would slow the mass already on the belt and that the accelerator servo would then need to re-accelerate these package thereby corrupting the measurement. We have determined that in a practical implementation, the momentum of the packages already on the belt is transferred in part to the newly arriving package such that the total momentum of all packages is conserved. The servo motor supplies only the difference of the force needed to accelerate all packages to the final speed which is equal to the impulse required of the Nth package alone. In this way the impulse supplied by the servo is the same whether there are prior packages on the accelerator belt or not.

Figure 8B:
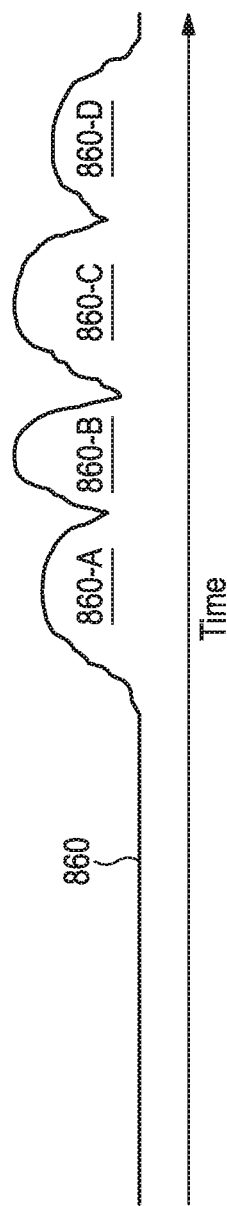

FIG. 8B is a simplified representation of torque measurements responsive to the parcels of FIG. 8A. Here, we see torque excursions in the torque signal 860 each time another parcel lands on the conveyor 850. The torque signal excursions are labeled 860-A, 860-B, etc. with the alpha suffix identifying the corresponding parcel in FIG. 8A. In FIG. 8B, the acceleration model is that the accelerator belt is moving at a higher velocity than the in-feed (although it could be moving slower as well). In this model, the total force applied by the servo is calculated by integrating each impulse (860-A, 860-B, etc.) over its respective period. This total force is linearly mapped to the change in momentum detected when new material arrives on the accelerator.

There may be a relatively small perturbation when a parcel leaves the conveyor, i.e., falls off the end. If desired, in some embodiments, this may be taken into account as follows. As each item is weighed, its mass may be recorded in memory, along with a timestamp or "time of arrival" which may be actual time or relative to some start time. Because the speed of the conveyor is well known, the expected time at which a given parcel will fall off the end can be estimated. Thus the effect of that perturbation can be taken into account. This information can be used to compensate for the case in which a parcel leaves at the same time that a new one arrives.

Our scale enables some extremely useful and valuable configurations. For example, it is required only that the acceleration impulse be isolated in time and not the physical presence of a package on a belt. An acceleration impulse can be 50-100 milliseconds in duration whereas it takes a 60 inch package 600 milliseconds to cross a given point on a conveyor moving at 100 inches per second. This means that the packages can be separated by zero gaps or even a negative gap (overlapping next to one another). This has the effect of greatly increasing the throughput of weighing devices and their surrounding processing systems.

It will be obvious to those having skill in the art that many changes may be made to the details of the above-described embodiments without departing from the underlying principles of the invention. The scope of the present invention should, therefore, be determined only by the following claims.

The invention claimed is:

1. A method of weighing a moving parcel comprising the steps of:
   providing an infeed conveyor for moving a parcel;
   providing a weighing conveyor arranged to receive the parcel from the infeed conveyor;
   providing a servo motor for driving the weighing conveyor;
   providing a servo system coupled for driving the servo motor responsive to a velocity command input signal;
   providing an initial, constant value velocity command input signal to the servo system to drive the weighing conveyor at an initial speed selected to match a speed of the infeed conveyor;
   detecting a parcel contacting the weighing conveyor;
   while the parcel is on the weighing conveyor, providing a time-varying, linearly increasing velocity command input signal to the servo system to cause a constant acceleration of the weighing conveyor and the parcel;
   acquiring first servo motor torque data from the servo system while the parcel is accelerating;
   after a selected weighing period, decelerating the weighing conveyor by returning to the initial, constant value velocity command input signal to the servo system;
   determining a mass of the parcel based on the first servo motor torque data.

2. The method of claim 1 including:
   acquiring second servo motor torque data from the servo system while the weighing conveyor is decelerating; and
   determining a mass of the parcel based on both the first and second servo motor torque data.

3. The method of claim 1 wherein determining the mass of the parcel is based on comparing the acquired torque data to stored calibration data.

4. The method of claim 1 wherein determining the mass of the parcel is based on a predetermined linear mapping of torque to mass.

5. The method of claim 1 wherein the initial speed is on the order of 2 m/sec, the selected weighing period is on the order of 100 msec, and a nominal acceleration is on the order of +4 m/sec^2.

6. The method of claim 1 including:
   detecting arrival of a second parcel on the weighing conveyor while a first parcel is still on the weighing conveyor;
   capturing an excursion in torque measurements, the excursion having a corresponding period beginning upon the arrival of the second parcel;
   integrating the torque measurements acquired during the excursion period to determine a force applied by the servo responsive to the arrival of the second parcel; and
   determining a mass of the second parcel based on the force applied by the servo responsive to the arrival of the second parcel, without regard to a mass of the first parcel.

7. The method of claim 1 including:
   as each parcel is weighed, recording its mass in a memory, along with a time of arrival on the weighing conveyor;
   estimating an expected fall off time for a parcel based on its recorded time of arrival; and
   compensating for the parcel falling off the weighing conveyor at substantially the same time as a time of arrival of a different parcel in determining a mass of the different parcel.

8. The method of claim 1 including:
   responsive to detecting arrival of a second parcel, decelerating the weighing conveyor;
   acquiring second torque data during the deceleration;
   determining a mass of the second parcel based on the second torque data;
   responsive to detecting arrival of a third parcel, while zero or more of the first and second parcels are still on the weighing conveyor, accelerating the weighing conveyor;
   acquiring third torque data during the acceleration responsive to detecting arrival of the third parcel; and
   determining a mass of the third parcel based on the third torque data.

9. The method of claim 8 including:
   estimating an expected fall off time for each of the first and second parcels; and
   compensating for the first and second parcels falling off the weighing conveyor where the respective fall off time is substantially the same time as arrival of the third parcel in determining the mass of the third parcel.

10. A weighing system comprising:
    an infeed conveyor arranged for moving a parcel;
    a weighing conveyor arranged to receive a parcel from the infeed conveyor;
    a servo motor coupled for driving the weighing conveyor;
    a servo system coupled to the servo motor to drive the motor responsive to a velocity command input signal;
    a control system configured to—
    first, apply an initial, constant value velocity command input signal to the servo system to drive the weighing conveyor at an initial speed selected to match a speed of the infeed conveyor;
    detect a parcel contacting the weighing conveyor;
    responsive to the parcel contacting the weighing conveyor, apply a time-varying, linearly increasing velocity command input signal to the servo system to cause a constant acceleration of the weighing conveyor and the parcel;

acquire first servo motor torque data from the servo system while the parcel is accelerating and store the first servo motor torque data;

determine a mass of the parcel based on the first servo motor torque data; and store results of the mass determination in a memory.

11. The weighing system of claim 10 wherein the control system is further configured to, after a selected weighing period, decelerate the weighing conveyor by applying the initial, constant value velocity command input signal to the servo system.

12. The weighing system of claim 10 wherein the control system is further configured to, acquire second servo motor torque data from the servo system while the weighing conveyor is decelerating; and determine a mass of the parcel based on both the first and second servo motor torque data.

13. The weighing system of claim 10 including a digital processor and wherein the control system comprises a scale control process implemented in software executable by the processor.

14. The weighing system of claim 10 including a sensor system coupled to the processor to provide signals indicating arrival of a parcel on the weighing conveyor.

15. The weighing system of claim 10 including a memory coupled to the processor and storing calibration data for use in mapping the servo motor torque data to mass of the parcel.

16. The weighing system of claim 10 wherein the control system is further configured to:

detect arrival of a second parcel on the weighing conveyor while a first parcel is still on the weighing conveyor;

capture an excursion in torque measurements, the excursion having a corresponding period beginning upon the arrival of the second parcel;

integrate the torque measurements acquired during the excursion period to determine a force applied by the servo responsive to the arrival of the second parcel; and determine a mass of the second parcel based on the force applied by the servo responsive to the arrival of the second parcel, without regard to a mass of the first parcel.

17. The weighing system of claim 10 wherein the control system is further configured to:

as each parcel is weighed, record its mass in a memory, along with a time of arrival on the weighing conveyor;

estimate an expected fall off time for a parcel based on its recorded time of arrival; and compensate for the parcel falling off the weighing conveyor at substantially the same time as arrival of a different parcel in determining a mass of the different parcel.

18. The weighing system of claim 10 wherein the control system is further configured to determine the mass of the parcel based on a predetermined linear mapping of torque to mass.

19. The weighing system of claim 10 wherein the control system is further configured to drive the weighing conveyor to an initial speed on the order of 2 m/sec, select the weighing period on the order of 100 msec, and command a nominal acceleration on the order of +4 m/sec^2.

20. A weighing system comprising:

an infeed conveyor arranged for moving a parcel;

a weighing conveyor arranged to receive a parcel from the infeed conveyor;

a servo motor coupled for driving the weighing conveyor;

a servo system coupled to the servo motor to drive the motor responsive to a velocity command input signal; and a control system configured to— accelerate the weighing conveyor until it reaches a predetermined peak velocity;

upon reaching the peak velocity, decelerate the weighing conveyor to a second velocity lower than the peak velocity;

acquire torque data from the servo system;

detect arrival of a parcel on the weighing conveyor; and determine a mass of the parcel based on the torque data acquired during a period beginning upon said detecting arrival of the parcel on the weighing conveyor.

* * * * *